(12) United States Patent
Duhr

(10) Patent No.: US 7,105,750 B1
(45) Date of Patent: Sep. 12, 2006

(54) LOW INSERTION FORCE GROMMET

(75) Inventor: Jerome Adam David Duhr, Westland, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/261,463

(22) Filed: Oct. 31, 2005

(51) Int. Cl.
*H02G 3/18* (2006.01)
(52) U.S. Cl. ............... 174/650; 174/650; 174/659; 174/662; 174/663; 16/2.1
(58) Field of Classification Search ........ 174/65 G, 174/152 G, 152 R, 153 G; 16/2.1, 2.2; 248/56; 184/151, 135
See application file for complete search history.

(56) References Cited

U.S. PATENT DOCUMENTS

| 4,081,879 A | 4/1978 | Rubright |
| 5,353,472 A | 10/1994 | Benda et al. |
| 5,659,924 A | 8/1997 | Gildersleeve |
| 6,051,795 A | 4/2000 | Fisher et al. |
| 6,058,562 A * | 5/2000 | Satou et al. ........... 16/2.1 |

* cited by examiner

Primary Examiner—Dhiru R. Patel
(74) Attorney, Agent, or Firm—Daniel R. Edelbrock

(57) ABSTRACT

A grommet mainly made of soft, pliable material has a flange section for sealing against a first side of a vehicle panel around an aperture through the panel. A groove separates the flange section from a conical section that tapers from the groove to a narrower tubular section for tightly fitting around a wire harness passed through the grommet. The conical section has a wider end adjacent the groove that presses against a second, opposite side of the panel when the groove receives an edge of the aperture and the grommet is seated on the panel. The conical section has a region that engages the edge of the aperture as the grommet is pulled to an installed position. A plurality of raised, hard, rigid contact pads are arranged in a circumferential row around the engagement region to provide low friction while sliding past the edge of the aperture when the grommet is pulled through the aperture. The contact pads are spaced apart by recesses that maintain the compressibility of the grommet and keep the soft grommet material between the pads from contacting the edge of the aperture during installation. Angled tabs extend from undersides of the contact pads to help secure the pads on the grommet. The contact pads are connected by a ring structure embedded in the conical section.

16 Claims, 4 Drawing Sheets

LOW INSERTION FORCE GROMMET

BACKGROUND OF THE INVENTION

1. Field of the Invention

The invention relates in general to grommets for routing wire harnesses through vehicle panel apertures and more particularly to a grommet having a raised, rigid material on an insertion engagement surface for lowering the force required to mount the grommet in the aperture.

2. Discussion of Related Art

Typical grommets have historically been difficult to install in vehicle bulkhead or panel apertures because of the high friction arising between an interface region or engagement surface of the grommet and an edge or edges of the aperture during insertion. The vehicle panel is usually made of sheet metal and the grommets often made of soft rubber. The edge of the aperture tends to bite or dig into the rubber, making it difficult to slide the grommet into the sealing position. Various methods have been used to reduce the force required to mount a grommet in an aperture of the panel through which a wire harness is to be routed. Sometimes a lubricating liquid is sprayed on the engagement surface at the assembly location. The lubricant often spreads to other vehicle locations and parts, and can foul the assembly area.

Other attempts to reduce friction include finishing the engagement surface in some manner to reduce contact at the insertion interface. FIG. 1 illustrates an example of a prior art solution that configures the engagement surface to reduce friction. A grommet 10 has a generally circular flange section 12 that seals against a wet side of the panel. The wet side could, for example, be an engine compartment, and an opposite, dry side of the panel could be a passenger compartment. An annular groove 14 separates the flange section 12 from a wider end 16 of a conical section 18. The groove 14 is sized to receive an edge of the aperture through the panel. The wider end 16 of the conical section 18 presses against the dry side of the panel. The conical section 18 tapers to a narrower end 20 integral with a tubular section 22. The tubular section tightly fits around a wire harness passed through the flange and conical sections.

To mount the grommet 10 in the panel aperture, the conical section 18 is pulled through the aperture until the edge of the aperture is received in the groove 14. To provide a tight fit and seal, an outer surface 24 of the conical section 18 adjacent the groove 14 must be wider than the aperture. The grommet 10 uses circumferential ridges or stipples 26 around the conical section 18 at the location of this outer surface 24. The ridges 26 are meant to provide more flexibility to the outer surface. However, these ridges 26 can catch on the sheet metal of the panel and often make it difficult to know when the grommet 10 is seated properly.

Another attempt to reduce the contact friction is disclosed in commonly assigned, co-pending U.S. patent application Ser. No. 11/212,751, filed Aug. 29, 2005. Circumferential rows of depressions are set into the engagement surface to reduce the amount of surface area coming into contact with the aperture edge during insertion of the grommet.

SUMMARY OF THE INVENTION

Accordingly, it is an object of this invention to lower the insertion force necessary to properly install a grommet on a vehicle panel by providing friction-reducing contact elements to a grommet engagement surface.

Another object of the invention is to guide the grommet to a seated position in an even, aligned manner by arranging the elements in a circumferential row around the entire engagement surface.

A further object of the invention is to enable the grommet to easily compress during insertion and to keep softer material of the grommet from contacting an edge of a panel aperture by placing recesses in the engagement surface between the contact elements.

In carrying out this invention in the illustrative embodiment thereof, a grommet mostly made of a soft pliable material has a generally conical section with an engagement surface or region that contacts the edge of the panel aperture during insertion of the grommet. Raised, hard, plastic contact pads are molded onto the engagement region. The contact pads are circumferentially spaced in a row around the grommet, allowing the grommet to remain flexible. Relief cuts or recesses are provided between the contact pads to keep softer material of the grommet from contacting the edge of the aperture and further enhance the ability of the grommet to compress during insertion. The hard plastic slides into and through the aperture more easily than a softer surface of the grommet.

Angled tabs extending from undersides of the contact pads would grip the grommet and help stabilize the pads. The contact pads may be connected by a ring structure. The ring structure would properly position the contact pads on the grommet and would be embedded in the conical section during the manufacturing process.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
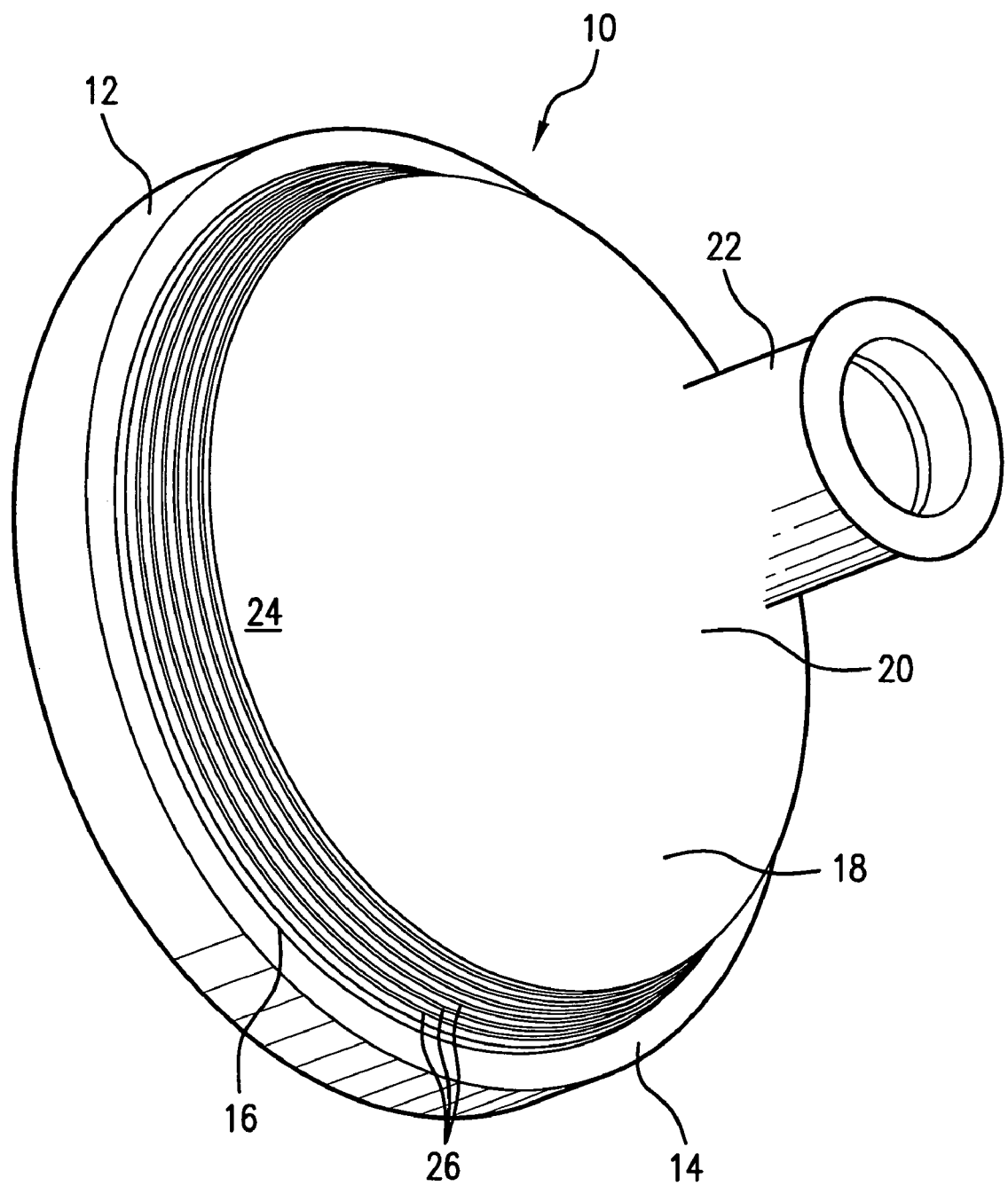
FIG. 1 is a perspective view of a prior art grommet.
Figure 2:
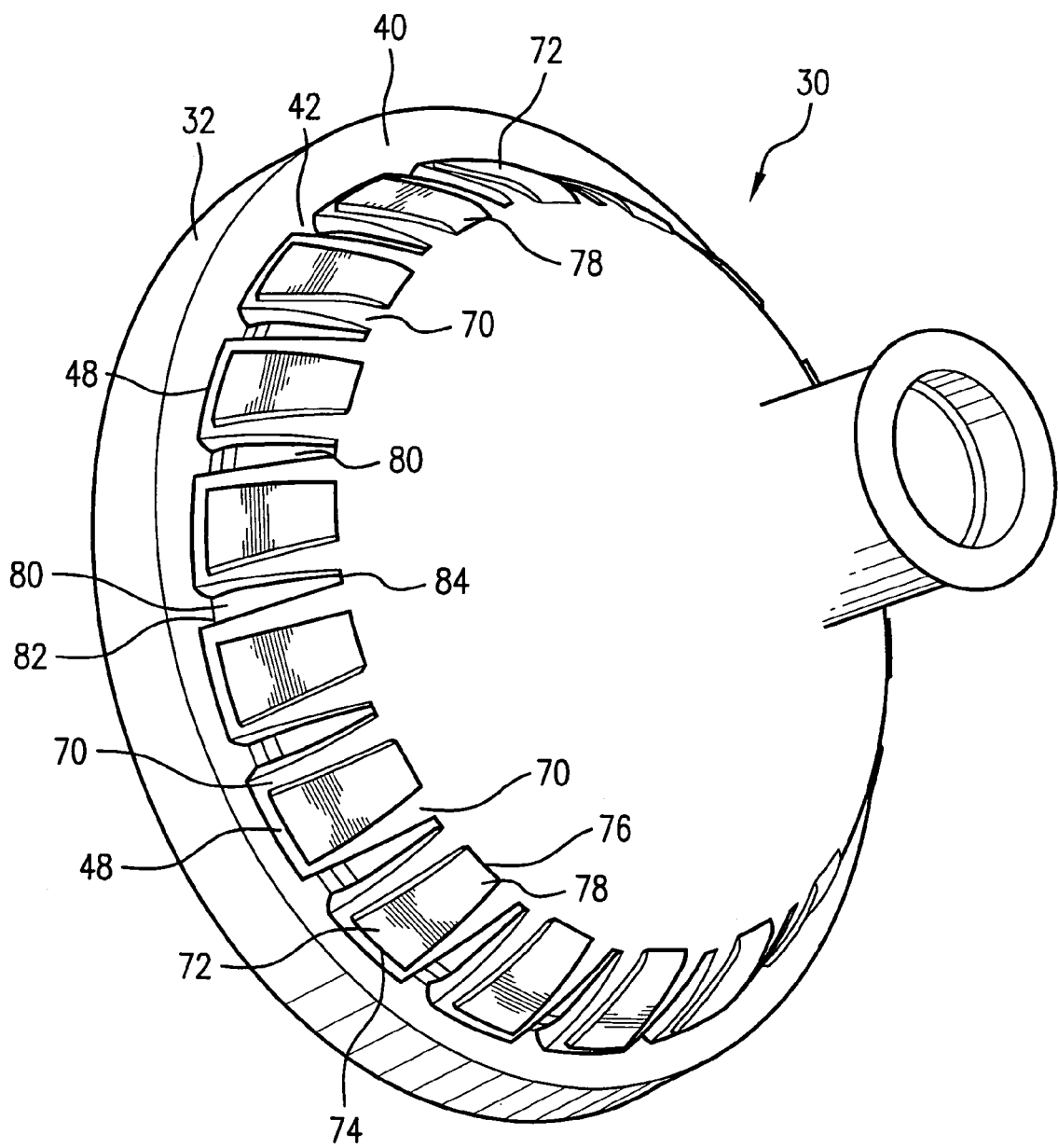
FIG. 2 is a perspective view of a low insertion force grommet having raised contact pads according to the present invention.
Figure 3:
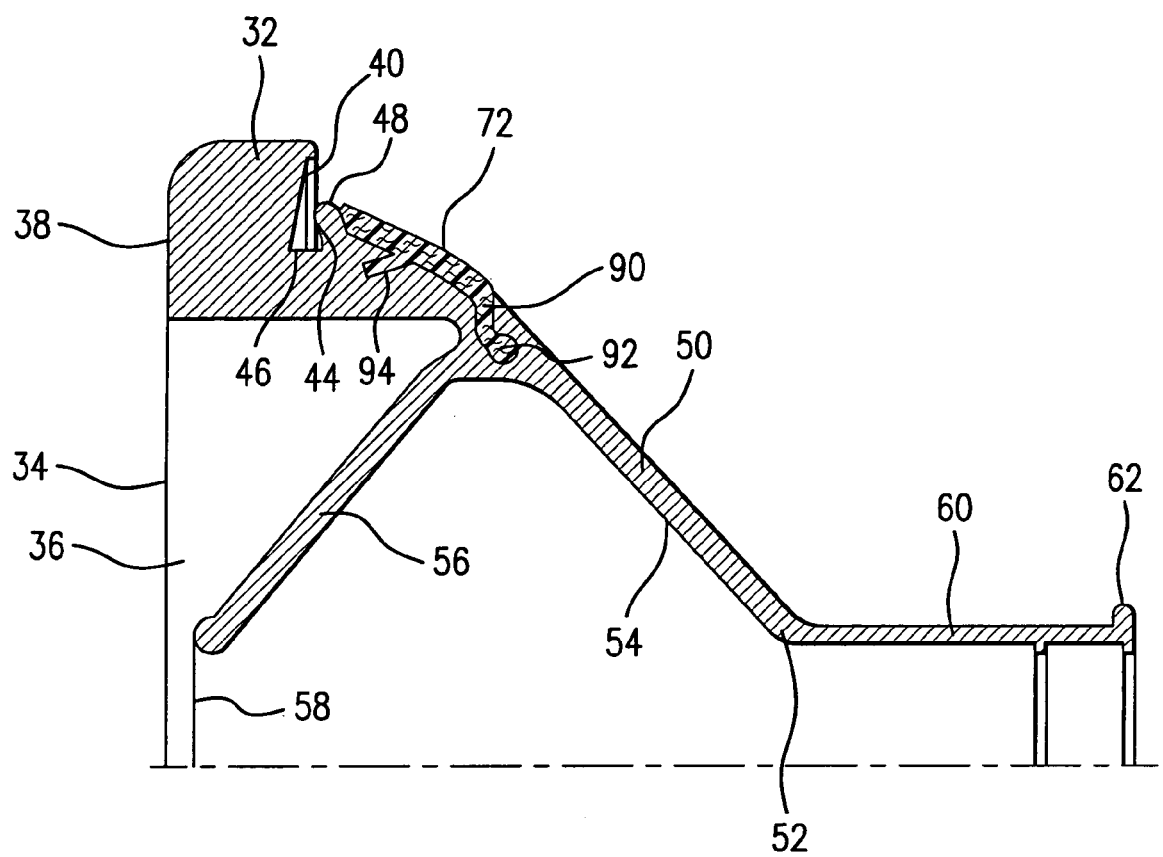
FIG. 3 is a half, cross-sectional side view of the grommet according to the present invention.

Referring now to FIGS. 2 and 3, a grommet 30 according to the present invention is illustrated. The grommet has a main part with a first, generally circular locking or flange section 32. An opening 34 into an interior 36 of the grommet 30 is surrounded by a first side 38 of the flange section 32. A second, opposite, sealing side 40 of the flange section 32 forms one side wall of a groove 42 extending around the grommet. The groove 42 has an opposite, shorter side wall 44 and a bottom wall 46. The shorter side wall 44 is at a first, wider end 48 of a second, generally conical section 50 that tapers or converges to a second, narrower end 52. The conical section 50 has an inner surface 54 facing the interior 36 of the grommet 30. An internal harness enclosure wall 56 extends into the interior 36 from the inner surface 54, converging to an entrance 58 near the flange section opening 34. The second end 52 of the conical section 50 is integral with a third, hollow, tubular section 60 having a taping provision or lip 62 distal from the conical section.

The main part of the grommet 30 is molded in one piece from a relatively soft, pliable and elastic material such as, for example, an EPDM rubber. The internal enclosure wall entrance 58 and tubular section 60 are sized to snugly fit around a wire bundle or harness (not shown) passed through the interior 36 of the grommet from the opening 34. Tape wrapped around the tubular section 60 at the location of the lip 62 would hold the grommet in place on the harness. The grommet 30 is used to guide and protect the harness as it is routed through a vehicle bulkhead or panel (not shown), as well as to seal a wet side of the panel from a dry side. For example, the wet side of the panel may face a vehicle engine compartment, and the dry side may face a passenger compartment of the vehicle. However, the grommet 30 is well-suited for use in other vehicle locations or environments. The panel is typically made of sheet metal. A hole or aperture through the vehicle panel has an inner edge forming the perimeter of the aperture.

The conical section 50 of the grommet 30 has an interface or engagement surface or region 70 in the form of a band around the conical section immediately adjacent its first end 48. The engagement region 70 is greater in diameter substantially along its length than a diameter of the panel aperture. Therefore, as depicted in FIG. 3, after the tubular section 60 and a portion of the conical section 50 near its second, narrower end 52 is inserted through the panel aperture, a significant force has to be applied on the grommet to continue the insertion process. The conical section 50, in the area of the engagement region 70, will contact the inner edge of the panel aperture and compress until the groove 42 receives and fits around the aperture edge. The groove 42 is sized to tightly receive the panel aperture edge between the sealing side 40 of the flange section 32 and the side wall 44 of the groove. The bottom wall 46 of the groove has substantially the same diameter as the panel aperture. The second side 40 of the locking or flange section 32 seals against the wet side of the panel and the side wall 44 of the groove 42 presses against the dry side of the panel.

In typical grommets, during compression of the conical section during insertion of the grommet through the panel, the edge of the panel aperture can catch on or bite into the soft material of the grommet. This increases the force necessary to seat the grommet properly. The present invention reduces the insertion force needed by spacing contact elements or pads 72 around the perimeter of the conical section 50 in the engagement region 70. The pads are made from a relatively hard, rigid material such as, for example, a glass-filled Nylon, or from any of various plastics with similar characteristics.

As best illustrated in FIGS. 2 and 3, the contact pads 72 protrude from a surface of the engagement region 70. The pads 72 are elongated in shape and narrow in width along their length from a first end 74 adjacent the wide end 48 of the conical section 50 to a second end 76. The contact pads 72 narrow in width to conserve material and reduce grommet weight. The second ends 76 of the contact pads would overlap a boundary of the engagement region 70 where the region would normally first contact the panel aperture edge. The second ends 76 have rounded surfaces 78 that blend into the conical section. The resulting curved profile prevents the second ends 76 of the contact pads 72 from catching on the panel aperture edge during insertion of the grommet 30 through the panel.

Between each contact pad 72 is a relief cut or recess 80 in the engagement region 70 of the conical section 50 of the grommet 30. The recesses 80 prevent the material of the main part of the grommet from contacting the aperture edge. The recesses 80 also allow the grommet 30 to compress more easily in the engagement region 70 during installation of the grommet. The recesses 80 are depicted as being substantially the same length of the contact pads 72. The recesses 80 have wider first ends 82 adjacent the wider end 48 of the conical section 50 where a higher degree of compressibility is needed, and taper to narrower ends 84. The recesses 80 also get shallower in depth from the first ends 82 to the second ends 84 to help maintain the structural integrity of the grommet 30 as the conical section 50 reduces in thickness.

Figure 4:
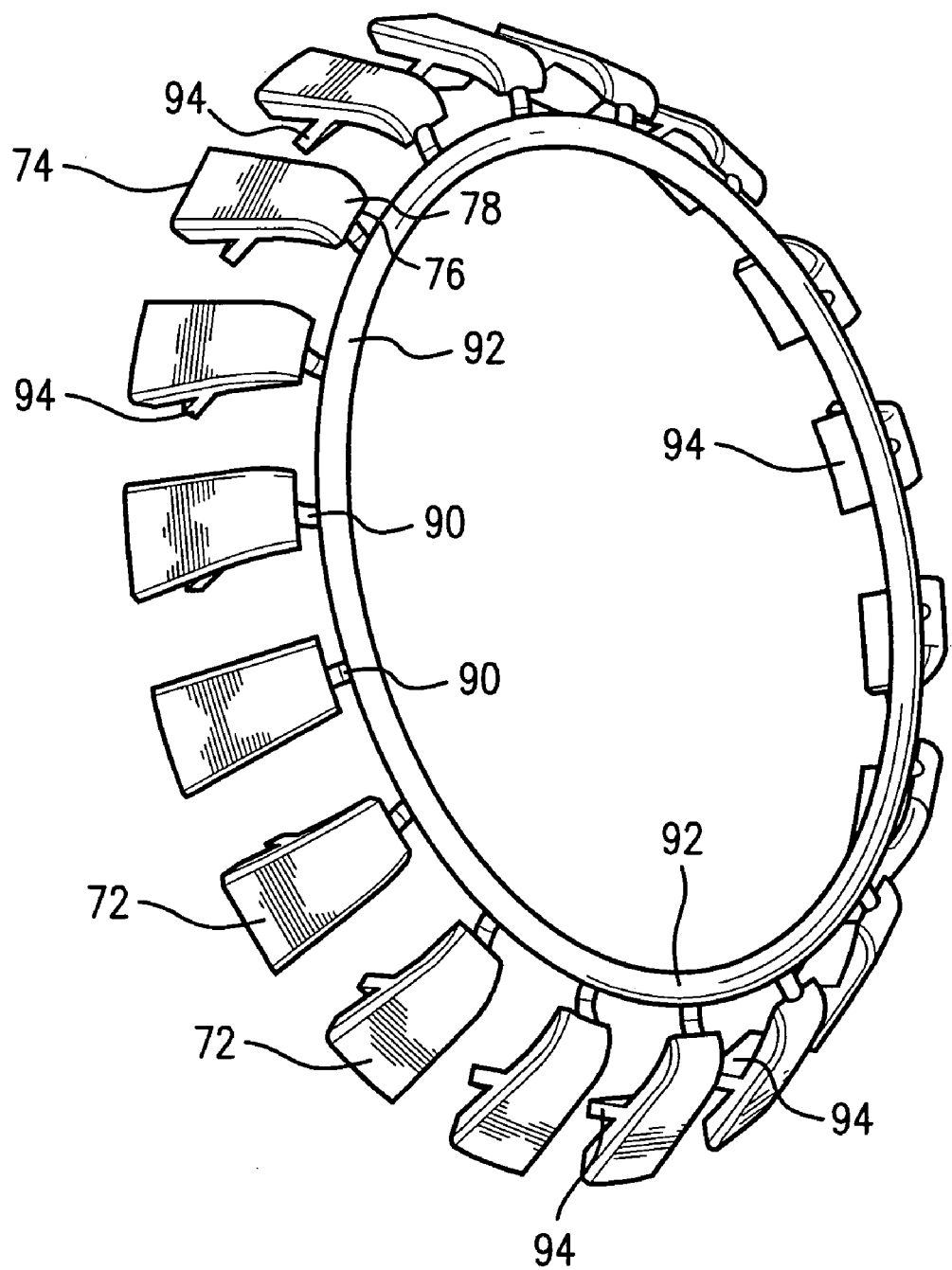
FIG. 4 is a perspective view separately illustrating a connecting structure for the contact pads to hold them in position during a grommet molding process.

The contact pads 72 can be placed in a circumferential row on the engagement region 70 on the conical section 50 of the grommet 30 using different types of insert-molding processes. FIGS. 3 and 4 suggest one unique structure and process. The contact pads 72 are pre-molded in a ring structure wherein each pad is connected by a strut or arm 90 to an offset ring 92. The ring 92 is in a different plane than the contact pads 72 and, as illustrated in FIG. 3, would be located closer to the second, narrower end 52 of the conical section 50 when the ring structure is insert-molded or otherwise embedded into the main part of the grommet 30. An angled or inclined tab 94 extends from an underside of each contact pad 72 to help secure and stabilize the pad within and on the conical section 50. Alternatively, the contact pads 72 could be separate elements insert-molded or over-molded onto the main part of the grommet 30.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A grommet having an engagement region for sliding past an edge of an aperture through a panel as the grommet is inserted to an installed position on the panel, the grommet further having a row of contact elements circumferentially spaced around the engagement region, the contact elements being separated by recesses formed in the engagement region, the contact elements being made of a material harder than the remaining material of the grommet.

2. The grommet of claim 1 wherein the contact elements are insert-molded into the engagement region of the grommet.

3. A grommet comprising:
   a tubular holding section for fitting around a member to be held in the grommet;
   an annular locking section wider than the holding section;
   a conical section extending between the holding section and the locking section, the conical section having a narrow end at the holding section and a wide end at the locking section, the conical section having an outer peripheral surface near the wide end;
   a plurality of protruding contact pads spaced around the outer peripheral surface of the conical section for guiding the locking section into a position securing the grommet within a panel aperture, wherein the holding section, locking section and conical section are made of a relatively soft, elastic material, and the contact pads are made of a relatively hard, rigid material; and
   a tab extending from an underside of each contact pad into the conical section.

4. The grommet of claim 3 wherein the material of the contact pads is a hard, rigid plastic.

5. The grommet of claim 3 wherein the contact pads each have a rounded end distal from the locking section, each rounded end curving into the conical section.

6. The grommet of claim 3 wherein the contact pads narrow in width as the contact pads extend further from the locking section.

7. The grommet of claim 3 further comprising a recess in the outer peripheral surface of the wide end of the conical section between each contact pad.

8. The grommet of claim 7 wherein the recesses become shallower in depth as the recesses extend from the locking section.

9. A grommet comprising:
   a first section for sealing against one side of a panel around an aperture through the panel;
   an annular groove adjacent the first section for receiving an edge of the aperture;
   a second section separated from the first section by the groove, the second section having a wider end adjacent the groove for pressing against another, opposite side of the panel, and a narrower opposite end, the second section further having an outer surface near the wider end and a plurality of contact elements circumferentially spaced around the outer surface, the contact elements being made of a relatively harder material than the second section, the contact elements each being connected to a ring embedded in the second section.

10. The grommet of claim 9 wherein the outer surface is a relatively narrow region extending around the second section immediately adjacent the groove.

11. The grommet of claim 9 wherein the contact elements are made of a hard rigid plastic and the first section and the second section are made of a soft, pliable material.

12. The grommet of claim 9 wherein the contact elements have a curved profile.

13. The grommet of claim 9 further comprising an angled tab extending from an underside of each contact element into the conical section.

14. The grommet of claim 9 wherein the contact elements are offset from a plane of the ring such that the ring is located closer to the narrower end of the second section than the contact elements.

15. The grommet of claim 14 wherein the contact elements are connected to the ring by struts embedded in the second section.

16. The grommet of claim 9 further comprising recesses formed in the outer surface between the contact elements.

* * * * *